April 16, 1963 NIRO AKAHANE 3,085,487
LIGHT SENSITIVE CONTROL MEANS FOR CAMERA
Filed April 26, 1960
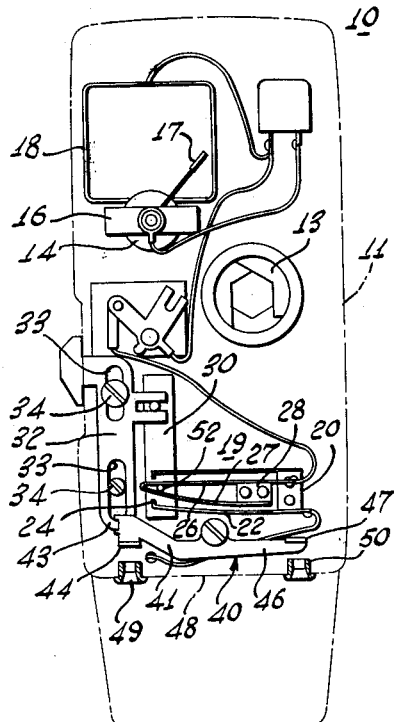
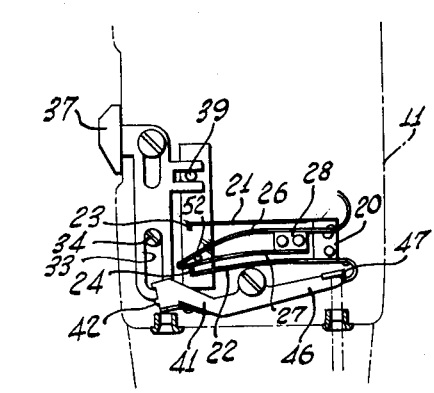
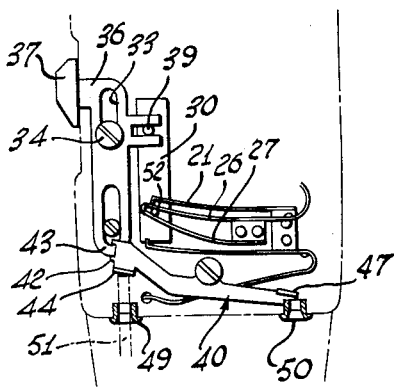
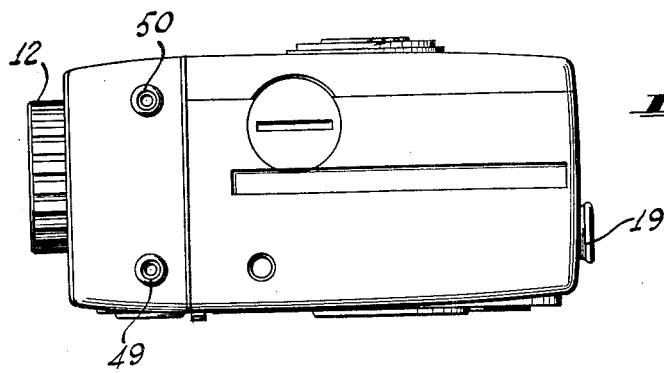
INVENTOR.
NIRO AKAHANE
BY Stanley Wolder
ATTORNEY United States Patent Office 3,085,487
Patented Apr. 16, 1963

3,085,487
LIGHT SENSITIVE CONTROL MEANS FOR CAMERA
Niro Akahane, Suwa-gun, Nagano-ken, Japan, assignor to Yashica Co. Ltd., Tokyo, Japan, a corporation of Japan
Filed Apr. 26, 1960, Ser. No. 24,826
Claims priority, application Japan May 4, 1959
2 Claims. (Cl. 95—64)

The present invention relates generally relates generally to improvements in photographic cameras and its relates more particularly to an improved photographic camera of the type provided with an automatic diaphragm which is responsive to ambient light conditions.

In employing the conventional photographic camera and particularly the amateur type motion picture camera the principal method of controlling the light incident upon the film is by the adjustment of the lens diaphragm. The lens openings, particularly when colored film is used, must be closely correlated with the film speed rating, shutter speed and the light conditions. Since the shutter speed and the film speed rating are usually predetermined, it is only necessary, to effect the continuous proper correlation of the effective parameters, to regulate the diaphragm opening in accordance with the light incident on the camera lens. While by the use of a photoelectric exposure meter to determine the light conditions, the lens aperture may be accurately adjusted, such procedure is usually beyond the skill of the ordinary amateur. In order to overcome this drawback, cameras are now available in which the diaphragm is automatically regulated in accordance with the light incident upon the camera. These cameras are usually provided with a photoelectric cell which is electrically connected either directly or through an amplifier to an electric drive device such as a sensitive current meter, the driven element or coil armature of the meter being mechanically coupled to the camera diaphragm to automatically regulate the diaphragm opening in accordance with the light incident on the photoelectric cell. While these automatically regulated diaphragm mechanisms heretofore available operate satisfactory initially, they posses numerous drawbacks. Principal among these is that the sensitivity of the automatic diaphragm mechanism to light is not uniform but varies with time. As a consequence, improper exposure of the film results and this arrangement leaves much to be desired.

It is thus a principal object of the present invention to provide an improved photographic camera.

Another object of the present invention is to provide a photographic camera having an improved automatically regulated diaphragm mechanism.

Still another object of the present invention is to provide an improved motion picture camera having an automatic light responsive diaphragm whose accuracy does not decrease with time.

A further object of the present invention is to provide a motion picture camera of the above nature characterized by its simplicity, ruggedness, accuracy and low cost.

The above and other objects of the present invention will become apparent from a reading of the following description taken in conjunction with the accompanying drawing wherein:

FIGURE 1 is a front elevational view of an improved mechanism in accordance with the present invention, the camera body being illustrated by broken line and the mechanism being shown in inoperative position;

FIGURE 2 is a partial view similar to FIGURE 1, the mechanism being illustrated in an operative position, during the taking of a motion picture sequence, a cooperative control cable being shown in broken line;

FIGURE 3 is a view similar to FIGURE 2 with the mechanism shown during an individual frame exposing position, a cooperative control cable being shown in broken line; and FIGURE 4 is a bottom view of the improved camera.

In a sense the present invention contemplates the provision in a photographic camera including a shutter mechanism and a diaphragm and a mechanism automatically regulating the opening of said diaphragm in response to the light incident thereon, a shutter release member movable between a retracted shutter check and an advance shutter release position, and means responsive to the position of said shutter release member deactuating said regulating mechanism when said release member is in its check position.

According to a preferred form of the present invention the camera shutter mechanism is of the type which selectively exposes an individual frame or continuously exposes successive frames. The shutter release member is movable in opposite directions from an intermediate position to respectively produce individual frame or motion picture sequences. The regulating mechanisms includes in its circuit a normally open switch and is actuated only upon the closing of this switch. The switch comprises a pair of first electrically connected resilient arms defining a first pole of the switch and a pair of second electrically connected resilient arms disposed between the first arms and defining the second pole of the switch. An element is carried by the shutter release member and registers with the second pair of arms. Upon movement of the shutter release member in either direction from its retracted position, first and second arms are brought into engagement before the shutter is released, actuating the diaphragm regulating mechanism to bring the diaphragm to its proper opening before the shutter is operated. There is also provided a cable actuating arrangement which includes a lever pivoted between its ends and coupled to the shutter release member. A pair of cable engaging bushings confront opposite ends of the lever.

Referring now to the drawing which illustrates a preferred embodiment of the present invention, the reference numeral 10 generally designates a motion picture camera incorporating the present improved mechanism, the camera, except for the system by which the diaphragm regulating mechanism is deactuated when the camera shutter is in checked position, being otherwise generally conventional. More particularly the camera 10 includes a body member 11 carrying a picture lens 12 associated with which is an adjustable diaphragm 13. The aperture of the diaphragm 13 is controlled by the armature or swinging coil 14 of a sensitive current meter 16 to which the diaphragm 13 is mechanically coupled. The swinging coil 14 also carries an indicator needle 17 which is visible through the camera view finder 18 by way of the associated eye piece 19.

A forwardly directed member such as a photoelectric cell is mounted on the camera body member 11 and is electrically connected in series with a normally open switch 19 to the current meter 16 either directly or indirectly such as by way of a current amplifying circuit, for example, a transistor type amplifier. It should be noted that the switch 19 may be disposed anywhere in the diaphragm motivating circuit so that the actuation of the switch 19 effects the energization of the diaphragm motivating circuit. Thus where a current amplifier is employed between the photosensitive device and the diaphragm motivating armature, the switch 19 may be connected between the amplifier power supply, to wit, the battery, and the amplifier so as to disconnect the battery from the amplifier and deenergize the diaphragm motivating circuit when the camera shutter is checked.

The switch 19 is mounted in the camera body member 11 and includes a first metal bracket member 20 fastened to a wall of the body member 11. Projecting forwardly from and supported by the bracket member 20 are a pair of first vertically spaced horizontally extending electrically connected upper and lower resilient arms 21 and 22 respectively, terminating at their free ends in inwardly directed contact elements 23 and 24 and defining a first pole of the switch 19. The second pole of the switch 19 is defined by a pair of second vertically spaced horizontally extending resilient upper and lower arms 26 and 27 respectively, disposed between the arms 21 and 22 and having their free ends sprung toward each other. The trailing ends of the arms 26 and 27 are supported by a bracket 28 and are electrically connected to each other and electrically insulated from the arms 21 and 22.

The camera 10 is provided with a conventional shutter drive and film advancing mechanism including a shutter release member 30. This shutter release member 30 is normally disposed in a retracted intermediate position, as illustrated in FIGURE 1 of the drawing wherein the shutter mechanism is in a checked inoperative position. The release member 30 is alternatively movable to a lowermost advanced position as illustrated in FIGURE 2, in which position, the shutter mechanism is released and continues running to expose successive film frames until the release member 30 is permitted to return to its retracted check position; and to its uppermost advanced position, as illustrated in FIGURE 3, in which position the shutter and film advance mechanism is operated to expose a single frame. A manipulatable trigger member 32 has longitudinal grooves 33 formed therein and is slidably supported by screws 34 registering with the grooves 33 secured to the body member 11. The trigger member 32 is provided with an arm 36 projecting through a vertical slot in the body member 11 and terminating in an external finger piece 37, and a rearwardly directed slotted yoke 38 engaging a pin 39 on the shutter release member 30 thereby permitting the manipulation of the shutter release member 30 by way of the finger piece 37.

In order to permit the cable control of the shutter release member 30 a lever 40 is pivoted to the body member 11 below the shutter release member 30 and trigger member 32 and at a point between the ends of the lever 40. The lever 40 includes a forwardly upwardly inclined arm 41 terminating in a transversely extending yoke 42 engaging the bottom cross piece 43 of the trigger member 32, and a horizontal ear 44 whereby the lever 40 is normally resiliently urged by the trigger member 32 to the intermediate position illustrated in FIGURE 1 of the drawing. The lever 42 also includes a rearwardly directed arm 46 terminating in a horizontal ear 47. Positioned in the bottom wall 48 of the body member 11 and in alignment with the lever ears 44 and 47 are threaded bushings 49 and 50 respectively which are adapted to receive and engage the conventional control cables 51 which may be of the well known sheathed type spring urged to a retracted position. Thus, as seen in FIGURE 3 of the drawing, depression of the control cable registering with the bushing 49 and bearing against the ear 44 swings the lever 40 clockwise and raises the trigger member 32 and shutter release member 30 to expose a single frame while the depression of the control cable which bears against the ear 47 and registers with the bushing 50, as seen in FIGURE 2 of the drawing, rotates the lever 40 counter-clockwise lowering the trigger member 32 and shutter release member 30 to effect a motion picture taking sequence.

The arrangement for actuating the switch 19 in accordance with the position of the shutter release member 30 and hence the operation of the camera shutter includes a pin 52 mounted on and movable with the shutter release member 30 and disposed between and abutting the confronting faces of the switch resilient arms 26 and 27 adjacent to their free ends. It should be noted that the switch arms 21, 22, 26 and 27 and pin 52 are so shaped and disposed that when the shutter release member 30 is in its retracted shutter check position the arms 21 and 22 are out of engagement with the arms 26 and 27 and the switch 19 is opened. When the shutter release member 30 is raised slightly and before it reaches its shutter release position, arm 26 is brought into contact with the arm 21 to close the switch 19 and when the shutter release member 30 is depressed slightly and before it reached its shutter release position arm 27 is brought into contact with the arm 22 likewise closing the switch 19.

In employing the camera described above, the operator merely directs the camera at the subject and either depresses or raises the finger piece 37 depending upon whether he desires a motion picture sequence or a single frame exposure. Upon movement of the finger piece 37 in either direction, the switch 19 is first closed in the manner described above by the moving shutter release member 30 to actuate or energize the normally deactuated diaphragm regulating mechanism and to thereby motivate the diaphragm 13 to its proper aperture in accordance with the light conditions. Further movement of the finger piece 37 to its advanced position advances the member 30 to a position releasing the shutter and permitting the operation thereof. It should be noted that sufficient time elapses between the closing of the switch 19 and the operation of the shutter mechanism to permit the automatic regulation of the diaphragm 13 according to the prevailing light conditions. The camera may be operated in the above manner by the use of control cables registering with the bushing 49 and 50. In this latter case, upon depression of the finger end of the cable which is engaged upwardly against the finger 44 to swing the lever 40 clockwise and raise the trigger member 32 which in turn raises the shutter release member 30. The raising of the shutter release member 30 closes the switch 19 to actuate the automatic diaphragm and effects a single taking sequence of the camera in a conventional manner. Upon the release of the finger piece of the cable the members 30 and 32 are permitted to return to their normal locked position, to which position in the conventional camera they are normally spring urged, thereby swinging the lever 40 counter-clockwise to its mid-position as illustrated in FIGURE 1 of the drawings.

The returning lever 40 urges the ear 44 downwardly, the ear 44 bearing against the associated cable to return it to its retracted position or, in the alternative, the spring normally associated with such cable will return it to its retracted position upon release of the finger plunger.

In a like manner, the depression of the finger piece of a cable associated with the bushing 50 will result in the counter-clockwise rotation of the lever 40 and the lowering of the members 32 and 30 to initiate the camera motion picture taking sequence.

In FIGURE 2 of the drawing the camera trigger mechanism is shown in its motion picture taking condition as actuated by a control cable engaging the bushing 50, and in FIGURE 3 of the drawing the release trigger mechanism is illustrated in a single frame taking sequence as triggered by a cable engaging the bushing 49. In either case, upon release of the cable plunger it is spring returned to its retracted position, permitting the release mechanism and the lever 40 to return to their dormant position.

The advantages of the regulating arrangement described above over the systems heretofore available are many. Principal among these is that the regulating mechanism operates only when the camera is employed, and this automatically so. As a consequence, any power source which may be employed is not consumed when the camera is not in use nor is any degeneration of the photosensitive element experienced. Further, the wear on the diaphragm mechanism is reduced considerably.

While there has been described and illustrated a preferred embodiment of the present invention it is apparent that numerous alterations, omissions and additions may be made without departing from the spirit thereof.

What is claimed is:

1. In a motion picture camera including a shutter mechanism selectively operable to effect a single frame and a multiple frame exposure and a diaphragm and a mechanism automatically regulating the opening of said diaphragm in accordance with the light incident thereon, a shutter release member movable from a retracted position to oppositely disposed first and second advanced positions respectively effecting the single and multiple frame operation of said shutter mechanism, a switch located in the circuit of said regulating mechanism said switch including a pair of first electrically connected oppositely disposed resilient arms defining one pole of said switch and a pair of second electrically connected resilient arms located between said first arms and insulated therefrom and defining the other pole of said switch, an element carried by said shutter release member and registering with said second arms to urge said second arms into electrical engagement with said first arms when said shutter release member is in advance of its retracted position and before it reaches its advanced shutter release position, a lever pivoted between the ends thereof and connected to said shutter release member to swing in opposite directions with the corresponding movement of said shutter release member, and a pair of members having apertures confronting respective opposite ends of said lever and adapted to engage control caps which are selectively reciprocatable to bear against respective ends of said lever whereby to correspondingly swing said lever and move said shutter release member.

2. In a photographic camera including a shutter mechanism selectively operable to effect a single frame and a multiple frame exposure and a diaphragm and a mechanism automatically regulating the opening of said diaphragm in response to the light incident thereon, a shutter release member slidably movable from a retracted position to oppositely disposed first and second advanced positions respectively effecting the single and multiple frame operation of said shutter mechanism, a switch located in the circuit of said regulating mechanism and including a pair of spaced electrically connected first contact members and a second contact member defined by a resilient arm electrically insulated from said first contact members and having a free end disposed between said first contact members and movable into selective engagement therewith, switch control means including an element mounted on said shutter release member and engaging said resilient arm, a trigger member provided with an accessible finger piece movably carried by said camera and connected to said shutter release member, a shutter release actuating lever rockable about a point between the ends thereof and engaging said shutter release member and swingable in opposite direction in accordance with the respective movement of said shutter release member, and a pair of members having apertures directed toward opposite ends of said lever and adapted to engage control cables which are selectively reciprocatable to bear against respective ends of said lever whereby to correspondingly swing said lever and move said shutter release member.

References Cited in the file of this patent

UNITED STATES PATENTS

| 2,412,424 | Rath | Dec. 10, 1946 |
| 2,655,086 | Walker | Oct. 13, 1953 |
| 2,841,064 | Bagby et al. | July 1, 1958 |

FOREIGN PATENTS

| 598,967 | Great Britain | Mar. 2, 1948 |